3,212,844
METALLOID AZIDES AND PROCESS FOR PREPARING THE SAME

Robert M. Washburn, Whittier, Calif., assignor to American Potash & Chemical Corporation, Los Angeles, Calif., a corporation of Delaware
No Drawing. Filed Nov. 3, 1961, Ser. No. 149,886
17 Claims. (Cl. 23—14)

The present invention relates to novel metalloid azides and to processes for preparing the same.

Broadly, the novel metalloid azides of this invention may be represented by the following general formula:

$$R_{3-n}P(=Z)(N_3)_n$$

wherein R is selected from the group consisting of alkyl and aryl groups; Z is selected from the group consisting of oxygen and sulfur; and $n$ is a whole number of from 1 to 3.

The metalloid azide compounds can be prepared by reacting (a) one mole of a compound having the formula $R_{3-n}P(=Z)X_n$ wherein R is selected from the group consisting of alkyl and aryl groups; Z is selected from the group consisting of oxygen and sulfur; X is a halogen atom; and $n$ is a whole number of from 1 to 3; with (b) from one to three moles of a compound having the formula $M'N_3$ wherein $M'$ is a metal selected from the group consisting of alkali metals and alkaline earth metals.

In carrying out the reaction it has been found that for each one mole of compound (a) there must be used from one to three moles of compound (b). The reaction must be carried out under anhydrous conditions in order to prevent the hydrolysis of both the phosphonylhalide starting material and the phosphonyl azide product. This can be achieved by carrying out the reaction in an inert atmosphere such as in the presence of nitrogen or argon or under vacuum.

In the formula above it is indicated that R is selected from the group consisting of alkyl and aryl groups. Examples of suitable radicals falling within these groups include:

Aryl. $C_6H_5$—; o, m, and p$Cl$—$C_6H_4$—; o, m, and p$CH_3$—$C_6H_4$—; o, m, and p$(CH_3)_2N$—$C_6H_4$—; o, m, and p$C_6H_5$—$C_6H_4$—; o, m, and p$CH_3O$—$C_6H_4$—; o, m, and p, F—$C_6HR$—; o, m, and p$Br$—$C_6H_4$—; o, m, and p$I$—$C_6H_4$—; o, m, and p$NO_2$—$C_6H_4$—; o, m, and p$C_6H_5OC_6H_4$—; α—$C_{10}H_7$—; β—$C_{10}H_7$—; and the like, and Alkyl. $CH_3$—; $C_2H_5$; i—$C_3H_7$—; n—$C_3H_7$—; n—$C_4H_9$—; i—$C_4H_9$—; sec.—$C_4H_9$—; $CH_3OCH_2CH_2$—; $CH_3OCH_2CH_2$—; $CH_3OCH_2CH_2CH_2$—; $C_6H_5CH_2$—; $C_6H_5CH_2CH_2$—; and the like.

The metalloid azides of this invention can be prepared in a variety of solvents including, for example, diethyl ether, di-n-butyl ether, benzene toluene, xylene, acetonitrile, and the like. The reaction may be carried out at temperatures varying from room temperature to about 150° C. The length of the reaction time can range from several hours to several days depending upon the temperature, solvent, and chemical properties of the reactants.

Examples of phosphonyl halides referred to above as compound (a) which may be used for the preparation of the phosphonyl azides include diphenyl phosphonyl chloride, bis(p-tolyl)phosphonyl bromide, bis(m-methoxyphenyl)phosphonyl chloride, bis(o-chlorophenyl)phosphonyl fluoride, bis(-naphthyl)phosphonyl chloride, phenylmethylphosphonyl bromide, methyl-n-octylphosphonyl bromide, di-n-butylphosphonyl fluoride, diphenylthiophosphonyl chloride, phenylmethylthiophosphonyl bromide, methyl-n-octylthiophosphonyl chloride, and the like.

To illustrate the invention even more fully, the following specific examples are set forth to exemplify the preparation of the azide compounds.

Example I

To a pyridine suspension of one mole of sodium azide is added one mole of diphenylphosphonyl chloride. The mixture is heated to reflux in an argon atmosphere. After filtration of the solids, the solvent is removed at reduced pressure to yield a dark yellow oil which is essentially pure diphenylphosphonyl azide.

Example II

In a similar manner, an acetonitrile solution of one mole of bis(p-tolyl)phosphonyl chloride and one mole of lithium azide, under an inert atmosphere, are stirred at room temperature. After removal of the solids and removal of the solvent, bis(p-tolyl)phosphonyl azide is obtained.

Example III

The interaction of equal molar quantities of bis(p-chlorophenyl)phosphonyl chloride and sodium azide in pyridine solvent as described in Example II, results in the formation of bis(p-chlorophenyl)phosphonyl azide.

Example IV

Following the same procedure used in Example I, the reaction of one mole of diphenylthiophosphonyl chloride and one mole of potassium azide yields pale yellow colored diphenylthiophosphonyl azide after removal of the solvent.

Example V

One mole of sodium azide and one mole of phenylmethylphosphonyl chloride, are reacted under argon in the absence of a solvent and at room temperature for two days. Removal of the solids by filtration and the solvent at reduced pressure yields phenylmethylphosphonyl azide.

Example VI

A benzene suspension of equal molar amounts of lithium azide and methyl-n-octylphosphonyl chloride are reacted as described in Example III to yield methyl-n-octylphosphonyl azide.

Example VII

A pyridine suspension of one mole of phenylmethylthiophosphonyl chloride and one mole of sodium azide is stirred for 2 days at room temperature. On removal of the solvent, phenylmethylthiophosphonyl azide is recovered.

Example VIII

The interaction of one mole of phenylphosphonyl dichloride and two moles of sodium azide in pyridine results in the formation of phenylphosphenyl diazide after removal of the solvent and solids.

Example IX

The reaction of three moles of phosphonyl trichloride and three moles of sodium azide in benzene solution yields phosphonyl triazide.

Example X

The interaction of one mole of thiophosphonyl trichloride and 3 moles of sodium azide in pyridine yields thiophosphonyl triazide after removal of solids and solvent.

Example XI

A suspension of equal molar quantities of sodium azide and bis(p-chlorophenyl)thiosphosphonyl chloride in pyridine is refluxed for about 8 hours to yield bis(p-chlorophenyl)thiophosphonyl azide.

Example XII

Using the procedure described in Example I, phenyl-p-tolylphosphonyl chloride is converted to phenyl-p-tolylphosphonyl azide.

Example XIII

Refluxing of one mole of methyl-n-octylthiophosphonyl bromide and one mole of potassium azide in benzene yields the methyl-n-octylthiophosphonyl azide.

Example XIV

Reaction of one mole of diphenylphosphonyl bromide with one mole of lithium azide in the absence of a solvent yields diphenylphosphonyl azide.

An additional feature of this invention is the preparation of a series of new and useful diphosphonyl diazides and tetraazides having the general formula:

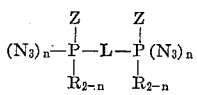

wherein L is selected from the group consisting of p-phenylene, m-phenylene, 4,4'-oxydiphenylene, 4,4'-thiodiphenylene, 1,4-naphthylene, 2,2'-propylidene, and the like;
R is selected from the group consisting of aryl and substituted aryl, and alkyl;
Z is selected from the group consisting of oxygen and sulfur; and
n is a whole number of from 1 to 2.

The diphosphonyl diazides and tetaazides can be prepared by reacting 2 to 4 moles of a compound having the formula $M'N_3$ as described above with one mole of a compound having the general formula

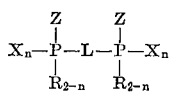

where Z, R and L are as defined above and X is halogen. The synthesis of these compounds is illustrated in the following examples.

Example XV

One mole of benzene-1,4-di(methylphosphonyl chloride) and 2 moles of sodium azide are refluxed in pyridine for 8 hours to yield, after removal of solids and the solvent, benzene-1,4-di(methylphosphonyl azide).

Example XVI

In a similar manner, one mole of benzene-1,4-bis-(phosphonyldichloride) and four moles of potassium azide react to yield benzene-1,4-bis(phosphonyl diazide).

The preparation of similar phosphonyl azides of this type is illustrated by the following reactions.

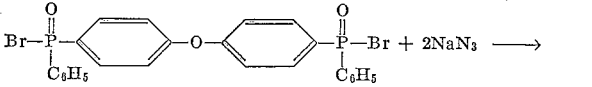

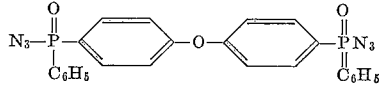

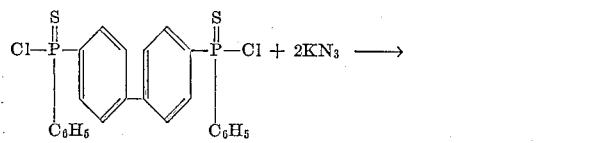

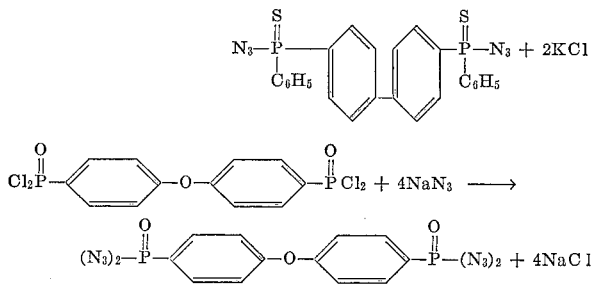

The conditions for the synthesis of these diphosphonyl diazides and diphosphonyl tetraazides vary depending upon the chemical properties of the reactants, choice of solvent, reaction temperature, and the like.

The metalloid azides of this invention are useful as blowing agents for the preparation of various foamed materials, such as foamed rubber, foamed polyurethane, foamed epoxy resins, foamed polyesters, foamed vinyls, and the like. The foamed materials, which incorporate the residues of the metalloid azides, have better thermal stability, oxidative stability, and ultraviolet light stability than foamed materials currently available. The increased stability is important, for example, when the foamed materials are used as structural potting materials in the electronic industry.

The metalloid azides are particularly useful and versatile as blowing agents. Blowing agents which have been used previously give off a gas at some particular temperature so that a polymer system must be modified to accommodate the blowing agent. However, when the metalloid azides of the present invention are used as blowing agents, it is possible to vary the temperatures at which nitrogen is liberated so that optimum reaction conditions can be chosen to provide the best polymer. The temperature at which the gas is liberated can be controlled from below 0° C. to about 175° C., and at the same time have a material which is stable on storage and under normal handling conditions.

The metalloid azides of the present invention are remarkably stable under ordinary conditions. The temperature at which nitrogen gas is liberated by a thermal reaction is determined by the structure of the particular oxide being used. In general, nitrogen is liberated at temperatures of about 100° to about 200° C.

Example XVII

A polyester having a softening point of about 150–190° can be converted to a polyester foam by adding 10 percent by weight of diphenylphosphonyl azide and heating with stirring as nitrogen gas is liberated.

The metalloid azides also can be used in conjunction with certain tertiary phosphorus compounds. When so used, the temperature of nitrogen evolution is dependent on the nature of the particular azide and the nature of the particular tertiary phosphorous compound employed.

Example XVIII

Tetraethylenepentamine (2.0 g.) is first mixed thoroughly with 20 g. Epon 828 (an epoxy resin having a melting point of 8°–12° C., an epoxide equivalency of 190 to 210, and a viscosity of Z–5 to Z–6 on the Gardner-Holdt scale), and then trimethyl phosphite (0.4 g.) and lastly diphenylphosphonyl azide (0.4 g.) was added. Care was taken not to expose the azide for prolonged periods to the atmosphere. There was no apparent nitrogen evolution at room temperature, and therefore the mixture was placed in an oven at 100° C. for 10 min., producing a thermoset resin with uniformly entrapped bubbles. The density of the cured resin was 0.797 g./cc. which represents approximately a 30% reduction.

Example XVIX

The same quantities and mixing procedure were used as described in Example XVII except that the curing agent consisted of 1.5 g. tetraethylene pentaamine and 2.2 g. dibutylethylene diamine. An 18.6 g. quantity of the formulation was placed in a suitable container in an oven at 100° C. for 20 min. The resulting rigid, thermoset form was found to have a density of 0.1767 g./cc. representing about an 83% reduction in the density of the amine-cured epoxy.

The phosphonyl azides, diphosphonyl diazides and diphosphonyl tetraazides are also useful as insecticides, ultraviolet stabilizers, oil additives, chemical intermediates for the preparation of phosphoranes, arsanes and stilbanes, rubber vulcanizers and stabilizers, and the like.

While the present invention has been described with respect to what at present are considered to be preferred embodiments thereof, it will be understood, of course, that certain changes, substitutions, modifications and the like may be made therein without departing from its true scope as defined in the appended claims.

What is claimed is:
1. Diphenylphosphonyl azide.
2. Bis(p-tolyl)phosphonyl azide.
3. Bis(p-chlorophenyl)phosphonyl azide.
4. Diphenylthiophosphonyl azide.
5. Phenylmethylphosphonyl azide.
6. Methyl-n-octylphosphonyl azide.
7. Phenylmethylthiophosphonyl azide.
8. Phenylphosphonyl diazide.
9. Phosphonyl triazide.
10. Thiophosphonyl triazide.
11. Bis(p-chlorophenyl)thiophosphonyl azide.
12. Phenyl-p-tolylphosphonyl azide.
13. Methyl-n-octylthiophosphonyl azide.
14. Benzene-1,4-bis(phosphonyll diazide).
15. Diphenyl ether-4,4'-bis(phenylphosphonyl azide).
16. Biphenyl-3,3'-bis(phenylthiophosphonyl azide).
17. Diphenyl ether-4,4'-bis(phosphonyl diazide).

References Cited by the Examiner
UNITED STATES PATENTS

| | | | |
|---|---|---|---|
| 2,649,464 | 8/53 | Hartley et al. | 260—349 |
| 2,712,026 | 6/55 | Schrader | 260—349 |
| 2,829,111 | 4/58 | Schrader | 260—349 |

WALTER A. MODANCE, *Primary Examiner.*

IRVING MARCUS, *Examiner.*